(12) United States Patent
Poletti et al.

(10) Patent No.: US 10,938,442 B2
(45) Date of Patent: Mar. 2, 2021

(54) SYSTEMS AND METHODS FOR WIRELESS COEXISTENCE IN AN UNLICENSED SPECTRUM

(71) Applicant: CABLE TELEVISION LABORATORIES, INC., Louisville, CO (US)

(72) Inventors: Mark J. Poletti, Louisville, CO (US); Joseph Padden, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/653,884

(22) Filed: Oct. 15, 2019

(65) Prior Publication Data

US 2020/0044688 A1 Feb. 6, 2020

Related U.S. Application Data

(63) Continuation of application No. 16/041,122, filed on Jul. 20, 2018, now Pat. No. 10,447,341.

(60) Provisional application No. 62/534,963, filed on Jul. 20, 2017.

(51) Int. Cl.
| | |
|---|---|
| *H04B 1/00* | (2006.01) |
| *H04B 1/715* | (2011.01) |
| *H04B 1/7156* | (2011.01) |
| *H04B 17/345* | (2015.01) |
| *H04W 72/04* | (2009.01) |

(Continued)

(52) U.S. Cl.
CPC ........... *H04B 1/715* (2013.01); *H04B 1/7156* (2013.01); *H04B 17/345* (2015.01); *H04W 72/0453* (2013.01); *H04B 2001/7154* (2013.01); *H04B 2001/71563* (2013.01); *H04B 2001/71566* (2013.01); *H04W 16/14* (2013.01); *H04W 84/18* (2013.01)

(58) Field of Classification Search
CPC .... H04B 1/715; H04B 1/7156; H04B 17/345; H04B 2001/7154; H04B 2001/71563; H04B 2001/71566; H04W 72/0453; H04W 84/18; H04W 16/14
See application file for complete search history.

(56) References Cited

U.S. PATENT DOCUMENTS 10,447,341 B2 * 10/2019 Padden ................. H04B 1/715
2016/0286554 A1 * 9/2016 Hareuveni ............. H04W 4/80

* cited by examiner

*Primary Examiner* — Dhaval V Patel
(74) *Attorney, Agent, or Firm* — Armstrong Teasdale LLP

(57) ABSTRACT

A base station for a wireless communications system operating in an unlicensed target band of a wireless medium includes a receiver configured to wirelessly (i) receive non-cooperative carrier data within the target band from a user equipment, and (ii) detect an operation of at least one spread spectrum channel within the target band. The station further includes a transmitter configured to wirelessly send non-cooperative carrier data within the target band to the user equipment, a memory configured to store computer-executable instructions, and a processor configured to (i) execute the computer-executable instructions, (ii) determine, based on the detection operation of the receiver, at least one sequence of the at least one spread spectrum channel, and (iii) perform at least one corrective action to mitigate interference between the transmitter and an operation of the at least one spread spectrum channel based on the determination of the at least one sequence.

22 Claims, 3 Drawing Sheets

(51) Int. Cl.
*H04W 84/18* (2009.01)
*H04W 16/14* (2009.01)

SYSTEMS AND METHODS FOR WIRELESS COEXISTENCE IN AN UNLICENSED SPECTRUM

CROSS REFERENCE TO RELATED APPLICATIONS

This application is a continuation of U.S. patent application Ser. No. 16/041,122, filed Jul. 20, 2018, which application claims the benefit of and priority to U.S. Provisional Patent Application Ser. No. 62/534,963, filed Jul. 20, 2018, both of which applications are incorporated herein by reference in their entirety.

BACKGROUND

The field of the disclosure relates generally to management of shared wireless communications, and more particularly, to wireless communication signal allocation in a shared unlicensed spectrum.

Conventional wireless communication systems utilize unlicensed shared spectra. For example, the 2.4 GHz, 3.5 GHz, and 5 GHz frequency bands are used with Wi-Fi, Bluetooth, Zigbee, and a range of other consumer, industrial, and medical wireless technologies. Other technology platforms also share the spectra in other frequency ranges, and available wireless spectra will become more intensively shared as demand for wireless technologies increases. In some instances, a licensed spectrum might be strictly licensed to a specified access technology, and would not be generally available to other access technologies within the same licensed spectrum.

One example of unlicensed spectrum is found in the industrial, scientific, and medical radio band (ISM band), which is a group of radio bands, or portions of the radio spectrum, that are internationally reserved for the use of radio frequency (RF) energy intended for scientific, medical and industrial requirements, rather than for communications. The ISM band extends further than merely the 2.4 GHz spectrum, but the following description is directed to operation within the 2.4 GHz spectrum for ease of explanation, and is not intended to be limiting.

RF modulation in the unlicensed 2.4 GHz ISM band generally uses techniques such as frequency-hopping spread spectrum (FHSS, or FHSS protocol) and/or direct-sequence spread spectrum (DSSS, or DSSS protocol). Bluetooth typically uses FHSS, whereas Wi-Fi typically uses DSSS, and both of these technologies operate in the 2.4 GHz ISM band. Wi-Fi technology focuses on data throughput, and the DSSS technique allows evenly-distributed channels (typically up to three) to be used simultaneously without overlapping each other. Bluetooth, on the other hand, focuses on interoperability between different communication devices, and its use of FHSS splits the 2.4 GHz ISM band into many channels (e.g., 79 channels of 1 MHz each). Bluetooth devices thus "hop" among these many channels as much as 1600 times per second in a pseudo-random pattern. Connected Bluetooth devices are grouped into networks called piconets, and each piconet typically contains one master device and up to seven active slave devices synchronized with a clock of the master.

Some conventional shared unlicensed spectrum technology systems utilize algorithm-based and sensing-based distributed access, which enable common use of a wireless resource, despite a lack of active coordination among users. For example, typical Wi-Fi systems employ a carrier sense multiple access with collision avoidance (CSMA/CA) network multiple access method, which is sometimes referred to as "listen-before-talk" (LBT), in which carrier sensing is used, but nodes attempt to avoid collisions by transmitting only when the channel is sensed to be idle (i.e., not being used). Wi-Fi devices employ a common, standards-based protocol to avoid interference among themselves and other users, which provides a substantially equal probability of access across all users in channel conditions.

Interference between Bluetooth and Wi-Fi tends to be minimal at present due to the hopping nature of the Bluetooth transmission. That is, if a Bluetooth device transmits on a frequency that overlaps the Wi-Fi channel while a Wi-Fi device is in LBT mode, the Wi-Fi device is configured to perform a random back off during which time the Bluetooth device will hop to a non-overlapping channel, thereby allowing the Wi-Fi device to begin its transmission.

However, some new technologies that are being introduced into the shared spectrum do not employ cooperative techniques. In particular, technologies utilizing Long Term Evolution (LTE), when operating in an unlicensed spectrum (LTE-U), may interfere with technologies such as Wi-Fi due to the centralized architecture of LTE and mobile systems where spectrum access is scheduled by the core network, instead of being coordinated with other access technologies accessing the same spectrum resources. Licensed-Assisted Access (LAA), which is part of the LTE-U family (also referred to as LAA LTE), specifies both contiguous and noncontiguous multi-carrier allocations, and introduction of LAA LTE has significantly increased the traffic throughput of LTE. Another LTE-based technology contemplated within the scope of this disclosure is MuLTEfire.

Present Federal Communication Commission (FCC) regulations prevent the use of Wi-Fi at the upper end of the ISM 2.4 GHz band, and specifically in the 11.5 MHz of the spectrum between 2,472 MHz and 2,483.5 MHz, due to tight out-of-band (OOB) requirements, as well as the inability of the present Wi-Fi spectral mask to comply with these FCC requirements. It would be desirable for LTE devices (including LAA, LTE-U, or MuLTEfire devices) to operate in this band since a spectral mask could be defined for the LTE devices such that the FCC OOB requirements can be met (e.g., for a carrier width of 10 MHz). However, such deployment of LTE devices would be problematic, because Bluetooth technology predominantly dominates this 11.5 MHz of spectrum because this spectral portion is essentially unoccupied at present due to the Wi-Fi limitations. Furthermore, at present there is significant resistance in the Bluetooth industry to new uses of this portion of the ISM spectrum. Accordingly, it is desirable to develop acceptable new techniques for coexistence within the ISM spectrum.

BRIEF SUMMARY

In an embodiment, a base station for a wireless communications system operating in an unlicensed target band of a wireless medium includes a receiver configured to wirelessly (i) receive non-cooperative carrier data within the unlicensed target band from at least one user equipment, and (ii) detect an operation of at least one spread spectrum channel within the unlicensed target band. The base station further includes a transmitter configured to wirelessly send non-cooperative carrier data within the unlicensed target band to the at least one user equipment, a memory configured to store computer-executable instructions, and a processor configured to (i) execute the computer-executable instructions, (ii) determine, based on the detection operation of the receiver, at least one sequence of the at least one spread spectrum channel, and (iii) perform at least one corrective action to mitigate interference between the transmitter and an operation of the at least one spread spectrum channel based on the determination of the at least one sequence.

In an embodiment, a method for coexistence of a non-cooperative technology operation with a Bluetooth network in a target band of a wireless medium is provided. The method implemented by at least one base station including a receiver, a transmitter, and a processor. The method includes steps of scanning the target band of the wireless medium for energy signatures above the noise floor and having a predetermined bandwidth corresponding to the Bluetooth network, detecting at least one energy signature having the predetermined bandwidth within the target band, identifying a frequency hopping pattern of the Bluetooth network by executing one or more of a listening subprocess, and inquiry messaging subprocess, and a querying subprocess, obtaining the hop sequence and phase of the identified frequency hopping pattern, and mitigating interference between the non-cooperative technology operation in the Bluetooth network by one or more of blanking at least one resource block slot of the non-cooperative technology and avoiding operation within the target band at the bandwidth of the detected energy signature.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
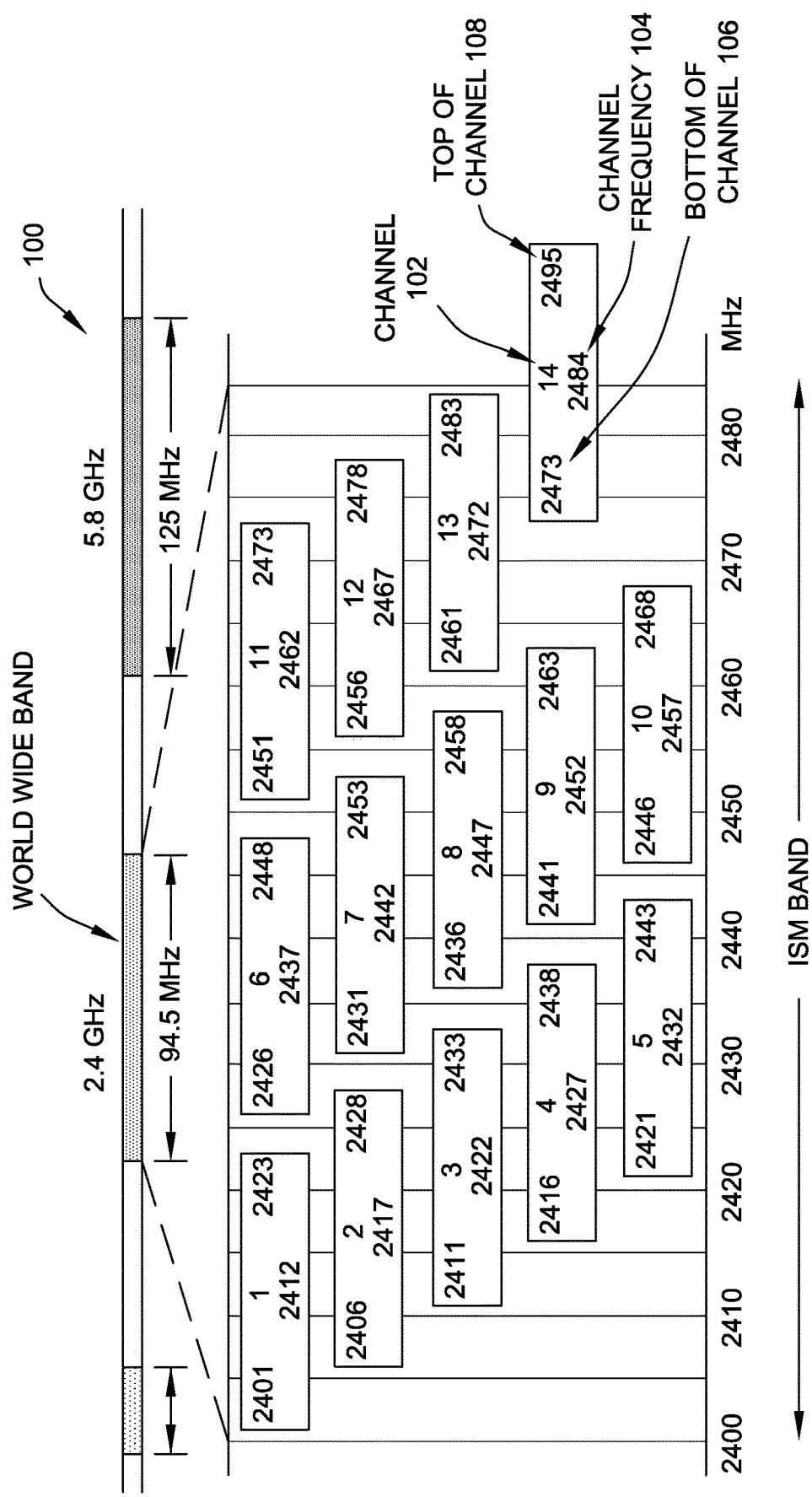
FIG. 1 is a schematic illustration of a channel allocation map of the unlicensed 2.4 GHz ISM band.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, the phrase "user equipment" includes an electronic device or system utilizing an aggressive, non-cooperative technology protocol, such as LTE. The phrase "Wi-Fi device" includes an electronic device, such as a station (or STA), that has the capability to use one or more existing 802.11 protocols. For example, a Wi-Fi device can include, without limitation, a laptop computer, a desktop personal computer (PC), a personal digital assistant (PDA), an AP, and/or a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

The following description features processes and systems for allocating LTE carriers in the unlicensed 2.4 GHz ISM band, such that the LTE-based technologies may coexist with Bluetooth technologies in the same unlicensed band (and optimally within a near geographical proximity as well). The present embodiments relate to management of wireless communications employing different access protocols operating in the same unlicensed spectrum and/or coverage area.

In the exemplary embodiment, an active LTE system is configured to (i) identify the frequency hopping pattern of one or more Bluetooth channels/networks within range of this co-channel LTE network, and (ii) blank the resource blocks or subframes in the LTE system, as needed, to prevent on-air collisions which might harm the Bluetooth transmissions.

Bluetooth technology generally includes three types of physical channels: (1) inquiry; (2) paging; and (3) basic, or adaptive frequency hopping (AFH) piconet physical channel, to mask used and unused channels due to interference. Each of these three types of physical channels has different frequency hopping characteristics. Inquiry and paging physical channels are slower, and more limited in frequency range. The basics/AFH physical channel, on the other hand, is known to jump all over the 2.4 band for the Bluetooth mode Basic Rate/Enhanced Data Rate (BR/EDR) and similar for the Bluetooth Low Energy (LE) dual mode, otherwise known as BR/EDR+LE.

In an exemplary embodiment, the LTE system is configured to be capable of learning active Bluetooth channels or networks in the vicinity of an LTE Base Stations, such as an Evolved Node B (also referred to as eNodeB, or eNB), or a New Radio next Generation Node B (also referred to as gNodeB, gNB, or NR gNB). For ease of explanation, the following references to the "base station" or "eNB" may be considered, for purposes of this description, to include LTE eNB and NR gNB operation. This learning capability can be accomplished according to a number of innovative techniques, which are not exclusive of one another, including without limitation: (i) active use of a Bluetooth chip in the eNB/gNB/base station; (ii) passive use of the BT chip; and (iii) reporting by user equipment (UE) devices within range.

More specifically, in the case where Bluetooth patterns are learned through active use of the Bluetooth chip disposed at the eNB/gNB/base station, the chip may be configured to perform a periodic inquiry to discover "masters" within range, and thereby be able to learn the inquiry sequence of such masters (i.e., by the inquiry physical channel). The active Bluetooth chip may be further configured to perform paging (i.e., by the paging physical channel), and then attempt to join any masters discovered by the paging, and thereby learning the paging sequence of such masters within range. In an embodiment, after successful conclusion of such paging operations, the LTE system is enabled to learn the basic/AFH piconet physical channel sequence. In some embodiments, the LTE system may obtain sufficient information to learn the basic/AFH piconet physical channel sequence even if the paging process is only partially completed, since the basic/AFH sequence may be defined by sufficiently by the address and clock of the master, both of which will be exposed during the paging operation.

In the case where Bluetooth patterns are learned through passive use of the Bluetooth chip, the LTE system is configured to listen for "beacon" messages that may be sent to parked slaves within range. In some embodiments, the frames constituting these beacon messages use a specific Channel Access Code (CAC) value that can be "heard" by most enabled devices. In other embodiments, the beacon messages are PIN-dependent. The beacon messages assist in keeping the parked slaves synchronized to the hopping sequence, and therefore the same messages are of further use it to the present LTE system for similar synchronization purposes. This technique is of particular use where the LTE system is under fewer time constraints to take the time to scan the greater amount of frequencies and wait to hear the beacons, and also with respect to Bluetooth networks that are less transient.

An alternative, or complementary, technique utilizes reporting from UEs that are attached to the base station of the present LTE/NR system. In this embodiment, the base station is configured such that the attached UEs report the pattern of Bluetooth networks of which the UEs are members. That is, a UE attached to the present LTE network may also be using a Bluetooth network as a master or slave, and will therefore know the patterns of any such Bluetooth networks that the UE is using. In one embodiment, the present LTE system is configured to have at least one dedicated message protocol for the UE to report the Bluetooth patterns to the base station. This technique will be more useful as a supplemental operation to the techniques described above than as a substitution, since not all Bluetooth networks in range of the base station may not be related to, or used by, a UE attached to the present LTE network.

Nevertheless, this UE reporting technique will significantly increase the protection range for the Bluetooth networks because the UEs will see a significantly wider RF view than the base station, given the spatial diversity within the LTE cell. In this example, the base station is configured to blank LTE resources for BT hop locations in all n*3 sequences based on the n Bluetooth networks to which the UE belongs.

Time and frequency are also factors that are to be considered with these operations. For example, a Bluetooth PHY having a width of 1 MHz will correspond to 6 LTE resource blocks (RBs). Accordingly, in this example, each LTE blanking event would be 6 RBs wide in frequency. If a guard RB is to be included on either side of data, the LTE blanking event may require 8 LTE RBs in this example. Furthermore, with a Bluetooth burst duration of 1-5 slots on a single frequency in the sequence, and for a slot of 625 μs, the LTE subframe may be 1 ms, and the LTE slot may be 0.5 ms. In the case of 6-8 RBs for each subframe, the LTE system might see up to a 12% loss of LTE capacity on a 10 MHz system. In this example, it may be desirable for the present system to blank no more than 5 subframes sequentially for each frequency hop location.

These techniques are described in further detail below with respect to FIGS. 1 and 2A-B. The following description presents additional embodiments for managing the coexistence of incumbent technologies, such as Bluetooth, with LTE technologies such as MulteFire, LAA, and NB-IoT, and particularly with respect to portions of the unlicensed 2.4 GHz ISM band that are capable of further coexistence exploitation. Such coexistence techniques are described specifically below with respect to FIG. 1.

FIG. 1 is a schematic illustration of a channel allocation map 100 of the unlicensed 2.4 GHz ISM band. As illustrated in FIG. 1, map 100 depicts Wi-Fi channel allocation in the ISM band, and specifically with respect to a channel 102. In this example, channel 102 is Channel 14 of the ISM band. Channel 102 includes a channel center frequency 104 (e.g., 2.484 GHz), a channel bottom 106 (e.g., 2.473 GHz), and a channel top 108 (e.g., 2.495 GHz).

In an exemplary embodiment, the present systems and methods are configured to manage coexistence within underutilized portions of the ISM spectrum. In this example, such underutilized spectrum can be seen in the lower half of channel 102 (e.g., Channel 14), where an additional 10 MHz of underutilized spectrum can be made available to support LTE-based small cell networks. Such LTE-based networks our managed according to the present embodiments to coexist without intrusive degradation to incumbent technologies, such as Bluetooth, thereby allowing for better band and spectrum utilization, as well as an improved ability to provide a wider variety of new and/or combined services within the coexisting networks.

That is, according to the present embodiments, the wireless industry will be advantageously enabled to make better use of existing spectrum to relieve congestion, offer new services, and provide improved quality of service for the services that are offered. These techniques are particularly valuable due to the fact that, at present, there is very little available unused spectrum. Accordingly, the ability to identify an exploit low-utilized portions of the allocated spectrum is of great importance.

Referring back to FIG. 1, at present, one known underutilized portion of the allocated spectrum is Channel 14 in the unlicensed 2.4 GHz ISM band. The unlicensed 2.4 GHz ISM band is presently dominated by devices following technology standards such as Wi-Fi, Bluetooth, and ZigBee. FCC regulations currently provide oversight on the RF specifications used to manager the transmit power, out-of-band (OOB) interference, and coexistence of these technologies within the band. As illustrated in FIG. 1, Channel 14 is a standard 20 MHz Wi-Fi channel at the upper band edge of the 2.4 GHz ISM band.

Since half (i.e., 10 MHz) of this 20 MHz channel actually lies outside of the ISM band, Channel 14 cannot be fully utilized according to the standards regulating the ISM band. As illustrated in map 100, portions of the 10 MHz of Channel 14 spectrum that does lie within the ISM band are also used by Channels 12 and 13. However, Channels 12 and 13 are less frequently used due to OOB emission restrictions at 2,483.5 MHz, and since the full ISM band is primarily dominated by Channels 1, 6, and 11, which are non-overlapping with respect to one another, and thus reduce the possibility of self-interference. Accordingly, as indicated on map 100, the 10 MHz of Channel 14 spectrum within the ISM band does not overlap with Channels 1, 6, and 11, and thus is significantly underutilized by the Wi-Fi technologies.

Channel 14 offers a unique opportunity for introduction of new coexisting services in this underutilized 10 MHz of spectrum within the ISM band, which cannot be exploited by typical Wi-Fi devices. Wi-Fi standard devices generally require utilization of 20 MHz channels, so the availability of only this 10 MHz portion would not be considered particularly useful for further Wi-Fi utilization. LTE-based technologies, however, are often capable of utilizing channel bandwidths of only between 1.4 MHz and 10 MHz (e.g., MulteFire, LAA, NB-IoT), and thus may be more readily adapted to exploit this underutilized 10 MHz of spectrum in Channel 14.

The type of services that such LTE devices could offer within this underutilized spectrum include, without limitation, cellular IoT, LTE service in enterprise networks, neutral host networks, hybrid LTE/Wi-Fi networks, and carrier aggregation between LTE and Wi-Fi. These new services may be provided in a complementary fashion, or as competitive services in such environments. Using LTE technology, the underutilized spectrum of Channel 14 may also now be used for small cell deployments, and/or in high usage areas, according to the present systems and methods.

The present embodiments advantageously exploit the underutilized 10 MHz of spectrum in Channel 14 through one or more of the techniques described above, and/or according to the exemplary coexistence process described below with respect to FIG. 2. These several exemplary processes and subprocesses manage the coexistence of LTE services with incumbent technologies in the 2.4 GHz Wi-Fi band, and particularly with Bluetooth devices operating in the ISM band that use a 1 MHz frequency hopping algorithm to provide short distance communication between cell phones, headsets, and peripheral devices. As described above, the Bluetooth standard is based on a frequency hopping algorithm that scans and discovers low noise, "claim" 1 MHz channels. When coexisting in the presence of Wi-Fi, a Bluetooth device will generally camp in the guard bands between channels, and in the lower half of Channel 14, namely, the underutilized 10 MHz of spectrum at issue in FIG. 1.

The following embodiments are described with respect to further processes and algorithms for an exemplary LTE-based small cell system to measure, detect and avoid Bluetooth transmission, at the PHY and MAC layers, to allow non-intrusive, non-performance degrading co-existence. For ease of explanation, the following description is limited to the small cell system example. Nevertheless, the person of ordinary skill in the art will understand that the several innovative embodiments and techniques herein apply to other cooperative and non-cooperative wireless technologies that may coexist in underutilized spectra.

The present embodiments therefore provide several significant benefits to the conventional spectrum allocation, including without limitation, the potential for spectrum gain, improved spectrum efficiency, the ability to offer new and/or combined services, coexistence of existing technologies and protocols, and the support for a neutral host cellular-NB-IoT network.

An LTE system according to the present embodiments is advantageously configured to learn the hopping algorithm in use by Bluetooth systems already occupying the 10 MHz band in question (e.g., lower half of Channel 14 in this example), and then actively blank LTE resource blocks that would overlap with the Bluetooth transmission. The Bluetooth frequency hopping algorithm is well documented in the Bluetooth specification. As described above, the LTE/NR base station can learn where in the sequence a Bluetooth piconet is. The following description provides just a few examples, by way of illustration, of how the learning process is accomplished. Again, these several processes, subprocesses, operations, and algorithms are not mutually exclusive of one another, and may be used in any combination or order, unless specifically described otherwise.

The several learning operations utilized by the present LTE system include, without limitation: (1) no Bluetooth present; (2) eNB/gNB/base station eavesdropping on the Bluetooth pairing sequence; (3) eNB/gNB/base station as slave to pair with masters; and (4) Bluetooth-enabled UEs report hopping sequence.

In the (1) no Bluetooth present operation, when the LTE base station powers up (and/or periodically thereafter, if desired) the BASE STATION is configured to perform a scan of the 10 MHz band (e.g., at issue in this example) and look for energy significantly above the noise floor that has approximately 1 MHz resolution bandwidth. In an exemplary embodiment, and after a fixed period sufficiently long enough to rule out the presence of Bluetooth (e.g., 10 seconds), a processor of the present system is able to conclude no Bluetooth is present, and control the system to operate as normal 10 Mhz LTE cell.

In the (2) base station eavesdropping operation, the base station is configured such that, when the LTE/NR base station powers up, and optionally periodically thereafter, the base station performs a scan for "beacon" frames sent from a Bluetooth master device to its parked slave devices. The these beacon frames serve to enable the parked slaves to maintain synchronization with the hopping sequence. In the exemplary embodiment, the base station is further configured to use the master address and clock value that is included in the beacon frames to determine the basic/AFH physical channel hopping sequence and phase. In the exemplary embodiment, the base station of the present LTE system includes receiver circuitry capable of detecting Bluetooth transmissions. In at least one embodiment, this base station eavesdropping operation includes a probabilistic detection algorithm that enables greater ability to learn the hopping sequence the longer the operation observes the pairing sequence of the Bluetooth network.

In the (3) base station slave/pair-with-masters operation, the base station essentially functions as a slave device, and when the LTE/NR base station powers up (and periodically thereafter), the base station is configured to perform the Bluetooth inquiry procedure to identify any master devices in the area. In the exemplary embodiment, after identifying the masters, the base station is further configured perform the Bluetooth paging procedure to attempt to pair with any master devices found within range. Irrespective of whether such pairing is successful, the base station would be enabled to learn the address and clock status of each master device within range, and therefore also the hopping sequence and phase of the master devices. In the exemplary embodiment this operation, the base station includes both receiver and transmitter circuitry capable of detecting and communicating, respectively, Bluetooth transmissions. Additionally, because this operation involves an active exchange between the base station and the Bluetooth master, this operation may be performed more quickly than less active, probabilistic operations In the (4) Bluetooth-enabled UE reporting operation, the base station is configured (e.g., using a messaging protocol) to learn the hopping sequence of Bluetooth networks from Bluetooth-enabled UEs attached to and operating within range of the base station. That is, in many cases, the UEs attached to an LTE eNodeB will be Bluetooth-enabled devices, and these enabled devices will be either masters or slaves to the Bluetooth in the range of the base station, and with which the enabled devices are paired. In such instances, the present LTE system may be advantageously configured such that the UE can directly communicate to the base station the hopping sequence and phase of the paired Bluetooth network. As described above, this operation is useful to increase the range of detection and protection, but may not necessarily detect all Bluetooth networks operating within range of the base station, since all such Bluetooth networks might not be paired with a UE attached to the base station.

Once the hopping sequence in phase has been identified to the base station, uplink scheduling and Almost Blank Subframes may be further managed by the base station. That is, after the hopping sequence and phase are determined, the base station may be configured to use Almost Blank Subframes, and/or avoid scheduling uplink transmissions in resource blocks identified as overlapping with the Bluetooth hopping sequence. In the case of synchronous Bluetooth channels, the base station may be further configured to inspect one or more transmission headers and determine that the type field of the header(s) is/or consistent. This determination advantageously enables the base station to better predict the length of future transmissions for more accurate resource blanking.

The embodiments described above are still additionally useful with respect to Bluetooth steering. For example, at particular times, the base station may determine that other channels within the 2.4 GHz ISM band are less utilized than the 10 MHz lower portion of Channel 14 used by the present LTE system. Upon such determination, and if it can also be determined that Bluetooth networks are operating in the lower 10 MHz of Channel 14, the present systems and methods may further configure the base station such that the base station introduces more collisions between the LTE and Bluetooth operations, such that the Bluetooth network operations would be encouraged to use other, more available channels in the 2.4 GHz band.

Figure 2A:
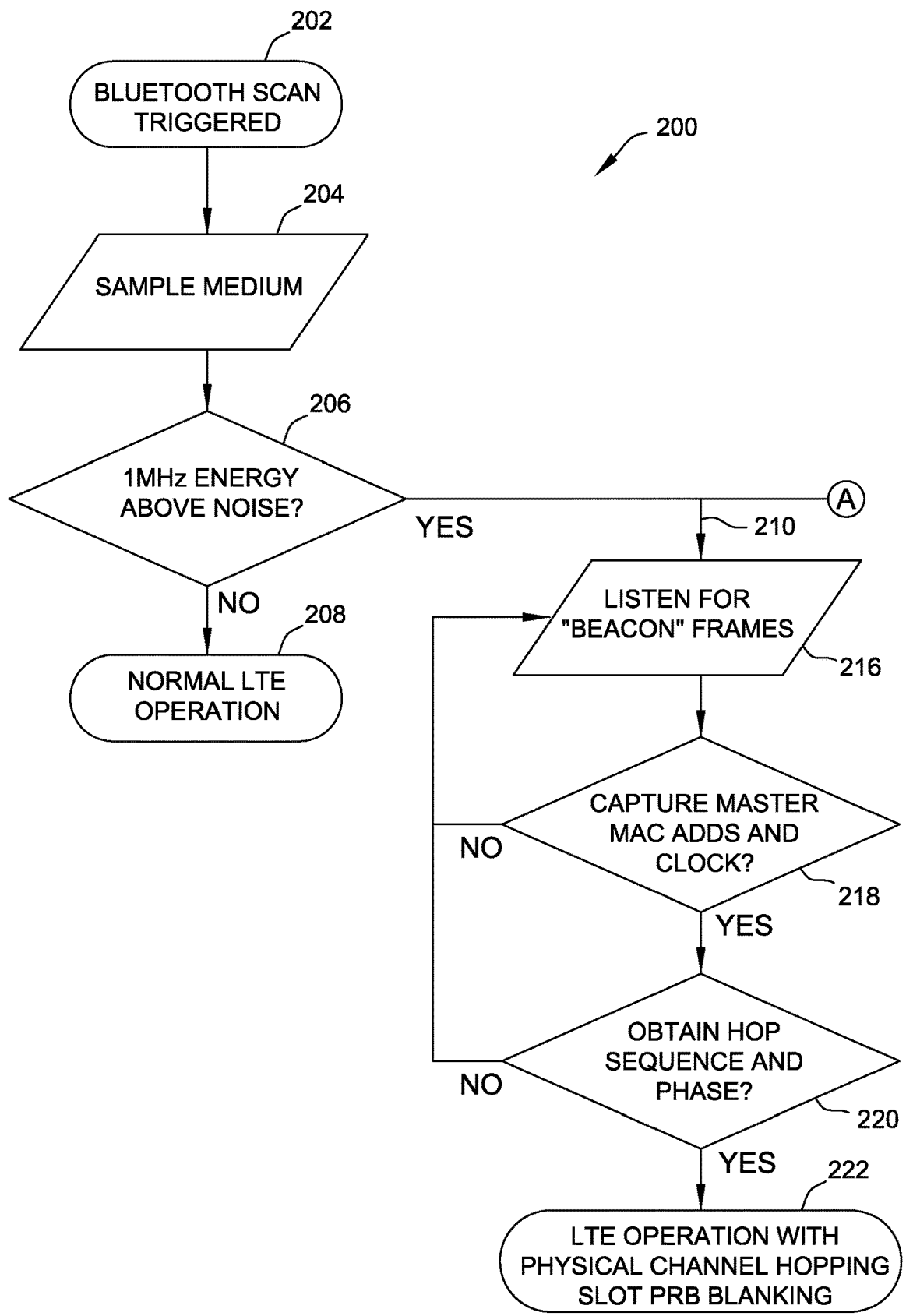
FIGS. 2A-B illustrate a flow chart diagram of an exemplary coexistence process, according to an embodiment.
Figure 2B:
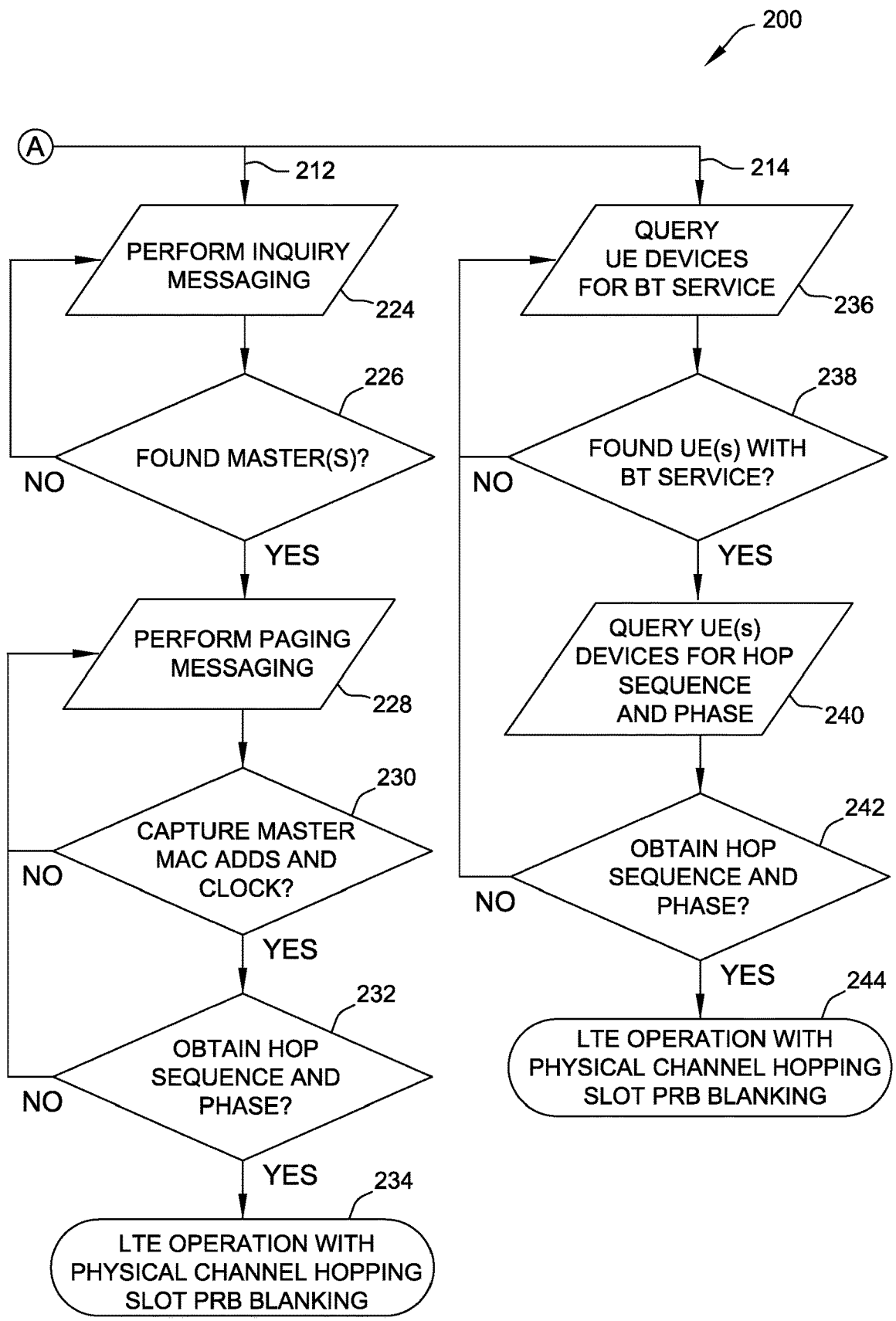

FIGS. 2A-B illustrates a flow chart diagram of an exemplary coexistence process 200. FIGS. 2A-B are described below as portions of the same process 200, and with reference to the several embodiments described above and maybe implemented by a base station of the LTE or NR system or a processor thereof, according to computer-executable instructions stored in a memory in operable communication with the processor.

Process 200 begins at step 202, in which a Bluetooth scan of the wireless medium is triggered. In an exemplary embodiment of step 202, the Bluetooth scan is performed by the base station, when the base station powers up (and optionally at periodic intervals thereafter). In step 204, the base station samples the wireless medium that is scanned in step 202. Step 206 is a decision step. If, in step 206, process 200 does not detect 1 MHz energy above the noise floor (e.g., a no Bluetooth present operational determination), process 200 proceeds to step 208, in which normal LTE operation proceeds. If, on the other hand, process 200 detects 1 MHz energy, process 200 proceeds to one or more of subprocesses 210, 212, and 214.

That is, upon detection of 1 MHz energy, process 200 and optionally proceed to execute any one, two, or all three of subprocesses 210, 212, and 214. Furthermore, subprocesses 210, 212, and 214 may be executed in sequence, simultaneously in parallel, or in any order determined by the processor of the LTE system.

Subprocess 210 begins at step 216, in which the base station listens for "beacon" frames (e.g., passively using a Bluetooth chip in the base station). Step 218 is a decision step. If the base station (or Bluetooth chip therein) is able to capture the MAC address and clock of a master, subprocess 210 proceeds to step 220. If, however, the base station is not able to capture the MAC address and clock, subprocess 210 returns to step 216. Step 220 is also a decision step. If the base station (or Bluetooth chip therein) is able to obtain the hop sequence and phase, subprocess 210 proceeds to step 222, in which the base station manages the LTE operation with physical channel hopping/slot resource block blanking. If, however, the base station is not able to obtain the hop sequence and phase, subprocess 210 returns to step 216.

Subprocess 212 begins at step 224 in which the base station is configured to perform an inquiry messaging operation of the wireless medium. Step 226 is a decision step. If the base station is able to detect or find one or more masters from the inquiry messaging performed in step 224, subprocess 212 proceeds to step 228, in which the base station performs a paging messaging operation of the medium. If, however, subprocess 212 is unable to detect a master in step 226, subprocess 212 returns to step 224. Step 230 is a decision step. If the base station (or Bluetooth chip therein) is able to capture the MAC address and clock of a master, subprocess 212 proceeds from step 230 to step 232. If, however, the base station is not able to capture the MAC address and clock, subprocess 212 returns from step 230 to step 228. Step 232 is also a decision step. If the base station (or Bluetooth chip therein) is able to obtain the hop sequence and phase, subprocess 212 proceeds to step 234, in which the base station manages the LTE operation with physical channel hopping/slot resource block blanking. If, however, the base station is not able to obtain the hop sequence and phase, subprocess 212 returns to step 228.

Subprocess 214 begins at step 236 in which the base station is configured to query attached UE devices for Bluetooth service and/or sequence information. Step 238 is a decision step. If the base station is able to determine or find one or more UE devices paired with a Bluetooth network, subprocess 214 proceeds to step 240, in which the base station is configured to further query the UE devices for the hop sequence and phase of the paired Bluetooth network. If, however, subprocess 214 is unable to such paired UEs in step 238, subprocess 214 returns to step 236. Step 242 is a decision step. If the base station (or Bluetooth chip therein) is able to obtain the hop sequence and phase, subprocess 214 proceeds to step 244, in which the base station manages the LTE operation with physical channel hopping/slot resource block blanking. If, however, the base station is not able to obtain the hop sequence and phase, subprocess 214 returns to step 236.

In the embodiments described above, a processor of the LTE system may be configured with one or more algorithms for scheduling LTE small cell operation in the 10 MHz of available spectrum in an underutilized channel, while managing the coexistence of this LTE operation with incumbent technologies, such as Bluetooth, operating in the same spectrum. In some instances, where the LTE system determines that other channels are available for Bluetooth operation, the system may optionally do the opposite, and temporarily create collisions that will encourage the Bluetooth operations to steer to the other available channels.

The embodiments herein describe and illustrate systems and methods for allocation of LTE carriers to coexist with incumbent wireless communications in the unlicensed spectrum of the 2.4 GHz ISM band. As used herein, the term "coexistent" generally refers to different wireless access systems using the same spectral resources, and within the same general geographical proximity of one another. Examples of technologies used in the unlicensed spectrum include without limitation Wi-Fi, Bluetooth, Zigbee, and with Wi-Fi (i.e., 802.11/a/b/g/n/ac/ax/ad and other 802.11 variants) and Bluetooth presently representing the dominant technologies for unlicensed shared access in the 2.4 GHz ISM band. As described above, Wi-Fi refers to an LBT technology that uses CSMA/CA to optimize the efficiency of distributed access across otherwise asynchronous access transceivers. Such cooperative technology includes coexistence features that allow it to first verify the availability of the media (e.g., by LBT), before accessing a channel, that the channel is clear prior to transmission of data. CSMA/CA then allows for the management of access control to all asynchronous users (i.e., user devices) on that channel.

Additionally, as described herein, mobile technologies such as LTE are considered synchronous access technologies, operating in the unlicensed spectrum (e.g., LTE-U) in a non-cooperative (e.g. using a non-compliant LBT algorithm with 802.11 type systems) manner as compared with other access technologies that cannot synchronize to the LTE radio access network (RAN). LTE has been widely deployed, and functions to dominate the unlicensed spectrum through a centralized control of aggressive transmission techniques. Cooperative LBT-based technologies are sometimes colloquially referred to as "polite" technologies, whereas the non-cooperative technologies (including LTE, MuLTEfire, and LAA) are sometimes referred to as "aggressive" technologies. LTE is considered aggressive because it schedules and applies traffic to the accessed channel without first assessing if the channel is clear of other network transmissions. Nevertheless, systems and methods according to the present embodiments enable an LTE-based system to proactively cooperate and coexist with incumbent wireless technologies, such as Bluetooth.

In the exemplary embodiments, each of the coexistence techniques described above may be implemented alone, or in combination with one or more of the other techniques. In some embodiments, the several techniques, operations, and algorithms may be implemented simultaneously, partially, in reverse order, and/or in succession. In some embodiments, an algorithm of a processor the LTE system and/or the base station is programmed to execute instructions to control and manage several hardware components to perform one or more of the operations described above.

Accordingly, by utilizing existing hardware and programmability already present in existing LTE devices, the innovative systems and methods described herein realize significant advantages over conventional shared access systems by implementing the LTE allocation and scheduling for shared access such that the LTE-based operations can coexist the non-LTE transmissions, such as Bluetooth, in an underutilized spectra. The present systems and methods are uniquely capable of utilizing available bandwidths of less than 20 MHz that may be typically undesirable to many Wi-Fi transmissions.

Exemplary embodiments of shared access communication management systems and methods are described above in detail, and particularly with respect to underutilized channels of the unlicensed 2.4 GHz ISM band. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transceiver for a wireless communications system operating in an unlicensed target band of a wireless medium, comprising:
   a receiver configured to wirelessly (i) receive first non-cooperative carrier data within the unlicensed target band from at least one user equipment device (UE) different from the transceiver, and (ii) detect an operation of at least one spread spectrum channel within the unlicensed target band;
   a transmitter configured to wirelessly send second non-cooperative carrier data within the unlicensed target band to the at least one UE;
   a memory configured to store computer-executable instructions; and
   a processor configured to (i) execute the computer-executable instructions, (ii) determine, based on the detection operation of the receiver, at least one sequence of the at least one spread spectrum channel, and (iii) perform at least one corrective action to mitigate interference between the transmitter and an operation of the at least one spread spectrum channel based on the determination of the at least one sequence.

2. The transceiver of claim 1, comprising at least one of an evolved node B (eNB) and a next generation node G (gNB).

3. The transceiver of claim 2, wherein the first and second non-cooperative carrier data conform to a protocol of one or more of long term evolution (LTE), unlicensed LTE (LTE-U), MuLTEfire, license-assisted access, and narrowband Internet of Things (NB IoT).

4. The transceiver of claim 1, wherein the unlicensed target band comprises the lower half of Channel 14 of the ISM band.

5. The transceiver of claim 1, wherein the at least one spread spectrum channel comprises a Bluetooth network using a frequency hopping pattern of a frequency hopping spread spectrum protocol.

6. The transceiver of claim 5, wherein the transceiver is configured to implement an LTE-based small cell backhaul operation, and wherein the processor comprises at least one physical (PHY) layer and at least one media access control (MAC) layer.

7. The transceiver of claim 5, further comprising at least one Bluetooth-enabled chip in operable communication with the processor.

8. The transceiver of claim 7, wherein the processor is further configured to identify the frequency hopping pattern of the Bluetooth network.

9. The transceiver of claim 8, wherein the processor is further configured to blank at least one of a resource block and a subframe based on the identified frequency hopping pattern.

10. The transceiver of claim 8, wherein the processor is further configured to (i) calculate underutilization of a separate wireless channel near to the target band, and (ii) steer operation of the Bluetooth network to the separate wireless channel by creating collisions with the second non-cooperative carrier data.

11. The transceiver of claim 8, wherein the processor is further configured to identify the frequency hopping pattern by actively querying an inquiry physical channel of the Bluetooth network by the transmitter.

12. The transceiver of claim 11, wherein the Bluetooth-enabled chip is configured to instruct the transmitter to page a paging physical channel of the Bluetooth network.

13. The transceiver of claim 12, wherein the Bluetooth-enabled chip is further configured to join at least one master discovered as a result of paging the paging physical channel of the Bluetooth network.

14. The transceiver of claim 12, wherein the processor is further configured obtain an address and clock of at least one master discovered as a result of paging the paging physical channel of the Bluetooth network.

15. The transceiver of claim 8, wherein the processor is further configured to identify the frequency hopping pattern by instructing the receiver to listen for beacon messages from a master to one or more parked slaves within range of the transceiver.

16. The transceiver of claim 8, wherein the processor is further configured to identify the frequency hopping pattern by querying the at least one user equipment to report at least one pattern of a Bluetooth network to which the at least UE is a member.

17. The transceiver of claim 16, wherein the receiver is further configured to receive frequency hopping pattern report messages from the at least one UE using a dedicated message protocol.

18. A method for coexistence of a non-cooperative technology operation with a Bluetooth network in a target band of a wireless medium, the method implemented by at least one central transceiver including a receiver, a transmitter, and a processor, the method comprising the steps of:
    scanning the target band of the wireless medium for energy signatures above the noise floor and having a predetermined bandwidth corresponding to the Bluetooth network;
    detecting at least one energy signature having the predetermined bandwidth within the target band;
    identifying a frequency hopping pattern of the Bluetooth network by executing one or more of a listening subprocess, and inquiry messaging subprocess, and a querying subprocess;
    obtaining the hop sequence and phase of the identified frequency hopping pattern; and
    mitigating interference between the non-cooperative technology operation in the Bluetooth network by one or more of blanking at least one resource block slot of the non-cooperative technology and avoiding operation within the target band at the bandwidth of the detected energy signature.

19. The method of claim 18, wherein the non-cooperative technology operation conforms to a protocol of one or more of long term evolution (LTE), unlicensed LTE (LTE-U), MuLTEfire, license-assisted access, and narrowband Internet of Things (NB IoT).

20. The method of claim 19, wherein the non-cooperative technology operation comprises LTE-based small cell backhaul.

21. The method of claim 18, wherein the unlicensed target band comprises the lower half of Channel 14 of the ISM band.

22. The method of claim 18, wherein the predetermined bandwidth is 1 MHz.

* * * * *